(12) United States Patent
Austin

(10) Patent No.: US 7,601,308 B2
(45) Date of Patent: *Oct. 13, 2009

(54) TRANSITION STRUCTURES AND CATALYTIC REACTION PATHWAYS FOR THE PRODUCTION OF HYDROGEN AND OXYGEN

(75) Inventor: Gary Nin Austin, Stillwater, OK (US)

(73) Assignee: Coastal Hydrogen Energy, Inc., Stillwater, OK (US)

( * ) Notice: Subject to any disclaimer, the term of this patent is extended or adjusted under 35 U.S.C. 154(b) by 750 days.

This patent is subject to a terminal disclaimer.

(21) Appl. No.: 11/046,081

(22) Filed: Jan. 28, 2005

(65) Prior Publication Data

US 2005/0178670 A1   Aug. 18, 2005

Related U.S. Application Data

(63) Continuation-in-part of application No. 10/448,779, filed on May 29, 2003, now Pat. No. 7,125,480, which is a continuation-in-part of application No. 10/065,429, filed on Oct. 16, 2002, now Pat. No. 6,669,827, which is a continuation-in-part of application No. 09/883,169, filed on Jun. 18, 2001, now abandoned.

(60) Provisional application No. 60/544,907, filed on Feb. 13, 2004.

(51) Int. Cl.
*B01J 19/08* (2006.01)
(52) U.S. Cl. ............... 422/186.3; 422/186; 204/278
(58) Field of Classification Search .......... 422/186.3, 422/186; 204/278
See application file for complete search history.

(56) References Cited

U.S. PATENT DOCUMENTS

| 4,061,555 | A | * | 12/1977 | Miyatani et al. | ............ | 204/242 |
| 5,587,069 | A | * | 12/1996 | Downey, Jr. | ............... | 210/192 |
| 5,711,770 | A | * | 1/1998 | Malina | ................... | 48/197 R |
| 6,346,419 | B1 | * | 2/2002 | Ryerson et al. | ............ | 436/117 |
| 6,468,498 | B1 | * | 10/2002 | Lee et al. | .................... | 423/619 |
| 6,669,827 | B2 | * | 12/2003 | Austin | ........................ | 204/270 |

OTHER PUBLICATIONS

Hideki Kato, Kiyotaka Asakura and Akihiko Kudo, "Mechanism of Highly Efficient Water Splitting on Ni0-Loaded NaTa03 Photo—catalysts Doped with Lanthanum Ions", Science University of Tokyo.

* cited by examiner

*Primary Examiner*—Kishor Mayekar
(74) *Attorney, Agent, or Firm*—Fellers, Snider, Blankenship, Bailey & Tippens, P.C.; Scott R. Zingerman

(57) ABSTRACT

The present invention provides a system and method for the dissociation of water into $H_2$ and $O_2$ gas. The system and method disclose a reaction vessel having at least one radiolysis apparatus, at least one photolysis apparatus, and at least one electrolysis apparatus, all in communication with said reaction vessel. The reaction vessel has a body, a first end and a second end defining an interior. Further, the reaction vessel has an inlet for receiving water from a water supply into its interior and at least two outlet ports to allows $H_2$ or $O_2$ to egress therefrom. Still further, at least one catalyst is located within the interior of the reaction vessel. The radiolysis apparatus, photolysis apparatus, and electrolysis apparatus, in combination the with the catalyst provides for the dissociation of water into $H_2$ and $O_2$.

20 Claims, 11 Drawing Sheets

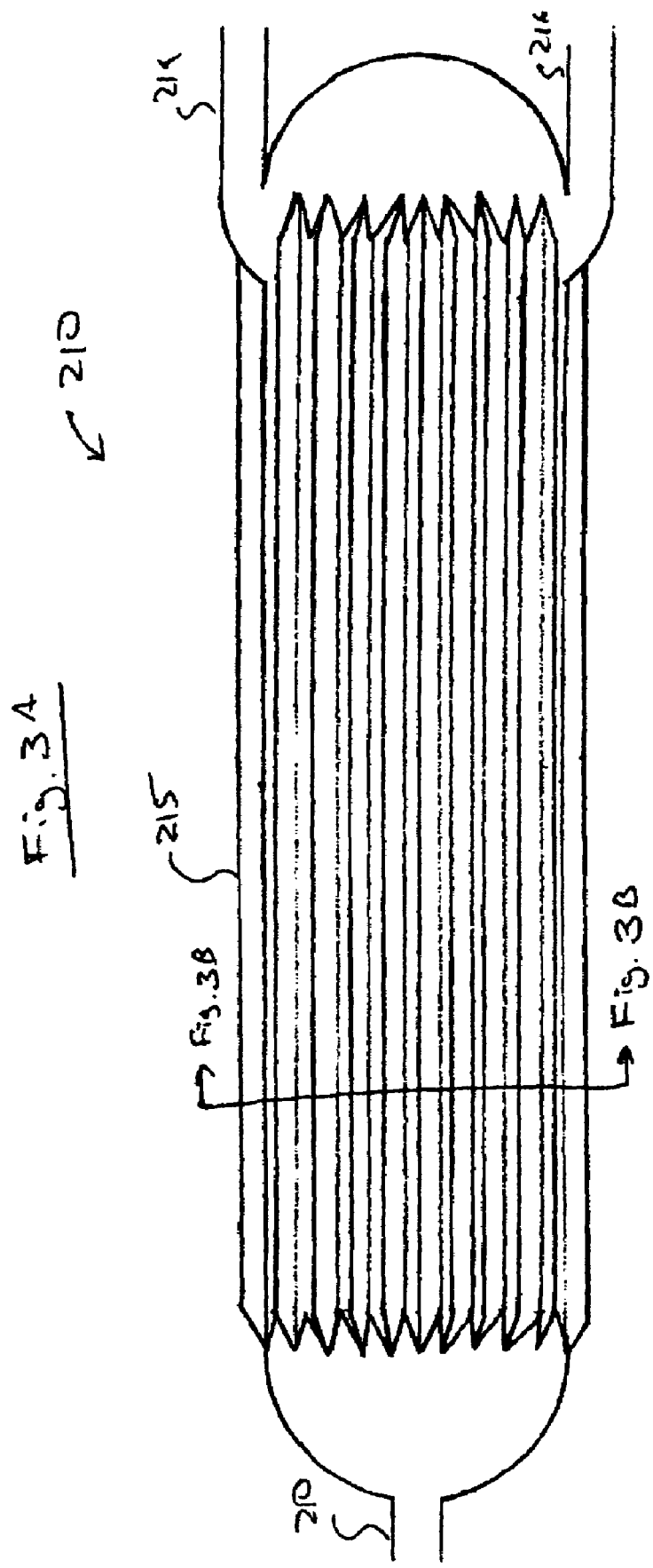

TRANSITION STRUCTURES AND CATALYTIC REACTION PATHWAYS FOR THE PRODUCTION OF HYDROGEN AND OXYGEN

CROSS-REFERENCE TO RELATED APPLICATION(S)

The present continuation-in-part application is related to, and claims priority from, U.S. Ser. No. 60/544,907 filed Feb. 13, 2004 and is a continuation-in-part of U.S. Ser. No. 10/448, 779 filed May 29, 2003, now issued U.S. Pat. No. 7,125,480 B2, which is a continuation-in-part of U.S. Ser. No. 10/065, 429 filed Oct. 16, 2002 now issued as U.S. Pat. No. 6,669,827 B2, which is a continuation-in-part of U.S. Ser. No. 09/883, 169 filed Jun. 18, 2001, abandoned and incorporates said applications by reference into this document as if fully set out at this point.

FIELD OF THE INVENTION

The present invention generally relates to the production of hydrogen and oxygen. More particular, the present invention relates to the production of hydrogen and oxygen through an apparatus and method for the dissociation of water into its constituent elements of hydrogen and oxygen which utilizes transition structures and catalytic reaction pathways.

RELATED TECHNOLOGY

Photodissociation of the water molecule $H_2O$ has been shown in the prior art using various approaches including catalysts, ultraviolet light, superheated steam and solar pumped lasers. Also described are systems employing photochemical diodes, photo-voltaics, and various vessel configurations. Problems involved in these prior art systems have included volatility of hydrogen when obtained from superheated steam, excessive costs in systems using ultraviolet light sources, material and maintenance costs of systems employing catalysts, and the lack of gas purity in the gas separation process.

Additionally, the prior art attempts to obtain hydrogen from water has been stifled by the cost associated with such endeavors. The prohibitive cost is caused by various factors, including the process reaction mechanisms have been inefficient and the resultant methods did not account for the proper utilization of the necessary oxygen in the reaction processes.

What is therefore needed are systems and methods to obtain hydrogen from water which provides lower gas volatility, higher gas purity, with lower equipment and maintenance costs.

SUMMARY OF INVENTION

The present invention provides systems and methods for the ultra fast dissociation of the water molecule at relatively low temperatures, and at higher purity. The present invention further provides for the use of lower cost, near infrared light sources can be used dissociate the water molecule, and radiolysis techniques which can be used to further increase dissociation efficiency and gas purity.

In one aspect of the invention, an ultra fast photodissociation system is presented comprising a water acidifier, a water vaporizer, and a photolysis cell. The water acidifier is connected in fluid communication with a water supply, and is operable to acidify the supplied water to produce acidic water. The water vaporizer is connected in fluid communication with the water acidifier to receive the acidic water, and is configured to convert the received acidic water into acidic water vapor. The photolysis cell is connected in steam communication with the water vaporizer to receive the acidic water vapor, and is operable to dissociate the acidic water vapor into $H_2$ and $O_2$ gas.

In a second aspect of the invention, a photolysis cell is presented which is operable to dissociate water molecules into $H_2$ and $O_2$ gas. The photolysis cell includes one or more photolysis bottles, each photolysis bottle having an inlet configured to receive water molecules, an $H_2$ outlet configured to output $H_2$ gas, and a $O_2$ outlet configured to output $O_2$ gas. Each photolysis bottle further includes an undulated bottle wall defining an interior region of the photolysis bottle, and an optically reflective coating disposed on the undulated bottle wall. The deposited optically reflective coating operates to reflect light back within the interior region of the photolysis bottle, and to effectively reduce the wavelength of the light reflected therefrom.

In yet another aspect of the invention, water of any pH, in a liquid or vapor state is introduced in to a reaction vessel. The reaction vessel includes a body with two ends, an inlet port at one end for the ingress of the water and two outlet ports at the other end for the resultant hydrogen gas and oxygen gas to exit the vessel.

The reaction vessel is configured to be able to attach photolysis mechanisms to inject light into the vessel; to attach radiolysis mechanisms, such as wave guides, that emit RF into the vessel; and to attach electrolysis mechanisms to effect cathode anode migration for the respective gases (oxygen and hydrogen) to exit the vessel.

The reaction vessel further includes catalysis mechanisms, such as noble gases input through an entry port located on the vessel for the ingress of such mechanisms into the vessel or the coating of the interior surface of the vessel with transition metal oxides. These catalysis mechanisms induce a catalytic reaction in the molecular dissociation of the water. In the case of the transition metal oxides. These catalysis mechanisms effect the reflectance of the photolysis injected into the vessel and participate as a catalyst in the water molecule dissociation process.

In yet another aspect of the present invention, a system utilizes the captive dissociated hydrogen and oxygen molecules as set out above to enhance the operation of a solid oxide fuel cell is disclosed. One application of this aspect involves the generation of potable water and hydrogen fuel from salt water through distillation utilizing the solid oxide fuel cell as a heat and electric power source.

Other advantages and aspects of the invention will be obtained from studying the following drawings and detailed description.

BRIEF DESCRIPTION OF DRAWINGS

FIGS. 3A and 3B illustrate side and cross-sectional views, respectively, of a photolysis bottle in accordance with one embodiment of the present invention.

Figure 1A:
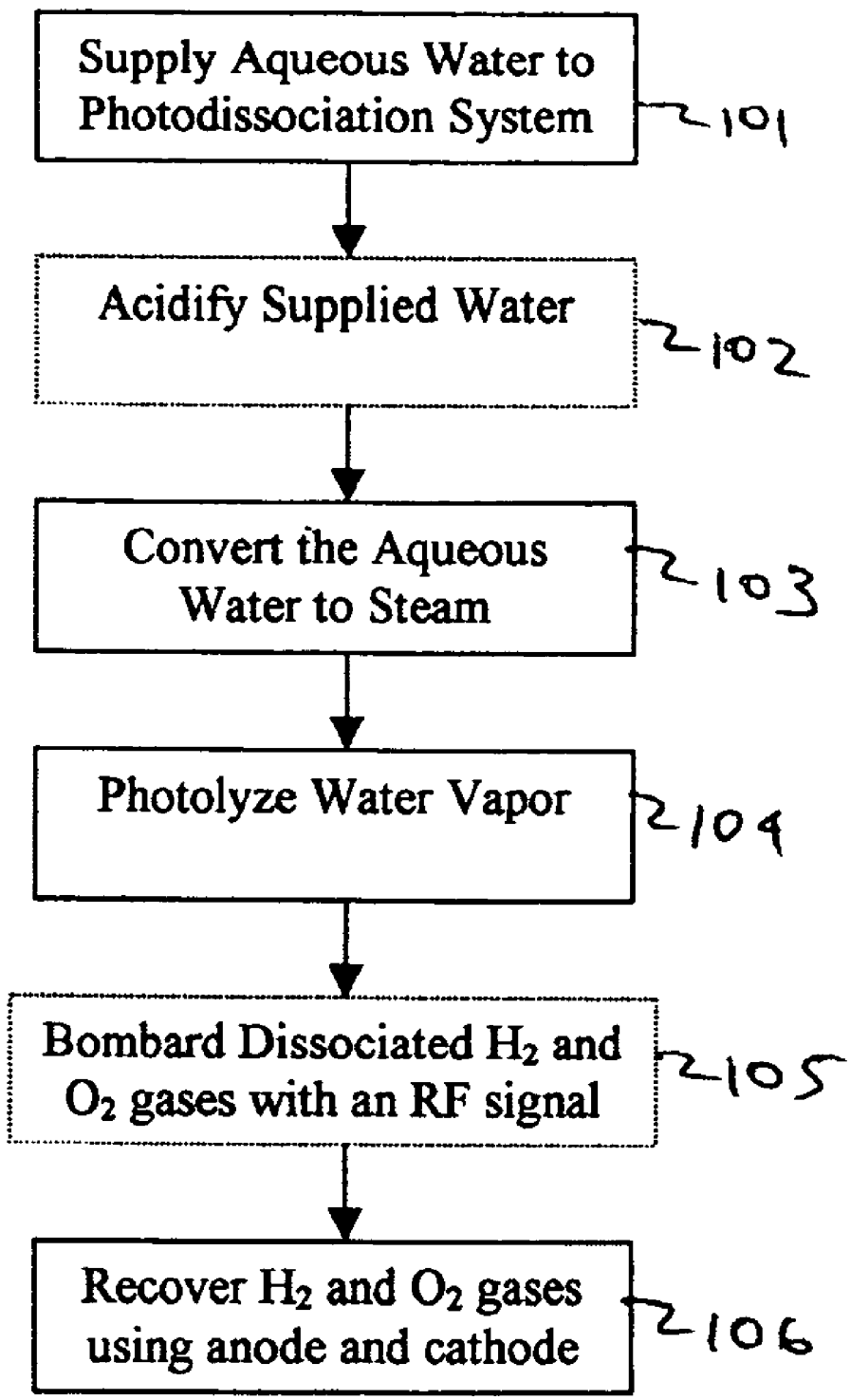
FIG. 1A shows a method employing ultra fast dissociation of water molecules in accordance with the present invention.

For clarity, previously described features are identified by their original reference numerals.

DETAILED DESCRIPTION

The energy required to dissociate the water molecule has previously been cost prohibitive to obtain hydrogen as a fuel, as the energy required to produce the $H_2$ fuel has been greater than the energy provided by the $H_2$ fuel produced. The present invention now describes a system which utilizes molecular water in a controlled state, specifically acidic water vapor, to more efficiently produce $H_2$ fuel. Acidic water, which includes the proton acid $H_3O^+$, is vaporized to produce the dihydronium molecule $H_5O_2$. The dihydronium molecule $H_5O_2$ requires much less energy to split compared to $H_2O$, as the dihydronium molecule presents a much larger target for photodissociation, and its bonds lengths are stretched in its vapor phase state.

Previous drawbacks of photodissociation systems have included the almost immediate recombination of the $H_2$ and $O_2$ constituents. The present invention employs a radiolysis approach in which the $H_2$ and $O_2$ constituents are bombarded with RF frequency ionizing radiation to inhibit their recombination, thereby resulting in higher conversion efficiency.

Additionally, the new photolysis cell presented herein has the capability of employing much smaller and cheaper near-IR light sources compared to UV sources used in conventional photodissociation systems. The new photolysis cell uses a lensing refraction arrangement in which an undulated surface on the photolysis cell wall is coated with an optically reflective material, the arrangement effectively reducing the wavelength of a near-infrared light source to the UV range. These and other features of the present invention will now be described in conjunction with the identified drawings below.

I. Photodissociation Methodology and Exemplary System

FIG. 1A illustrates a method for affecting the ultra fast photodissociation of a water molecule in accordance with one embodiment of the present invention. Initially at 101 aqueous water is supplied to a photodissociation system, an embodiment of which is shown and described in FIG. 1B below. The supplied water may be from any source, such as a well, a lake, or an ocean as will be described further below. Next at 102 the supplied water is acidified. The process may include using a reverse osmosis process, or a similar technique to lower the water's pH. The water's pH may be reduced to within a range of 1.5 to 6.9, more preferably within a range of 3.0 to 5.5, and even more preferably within a range of 4.0 to 5.0. In the instance in which the supplied water is already acidic, this process may not be required, or the process may be scaled back to add the acidity level desired.

Subsequently at 103 the acid water is heated and converted into an acidic water vapor, most preferably between the temperatures of 120 and 210.degree C. Producing water vapor at this relatively low temperature provides advantages, as the $H_2$ gas is much more stable, and subsequent processing equipment operates at reduced temperatures, lowering their cost and extending their life cycles. Finally at 104 the acidic water vapor is photolyzed into $H_2$ and $O_2$ gas, the process of which is further described below.

Figure 1B:
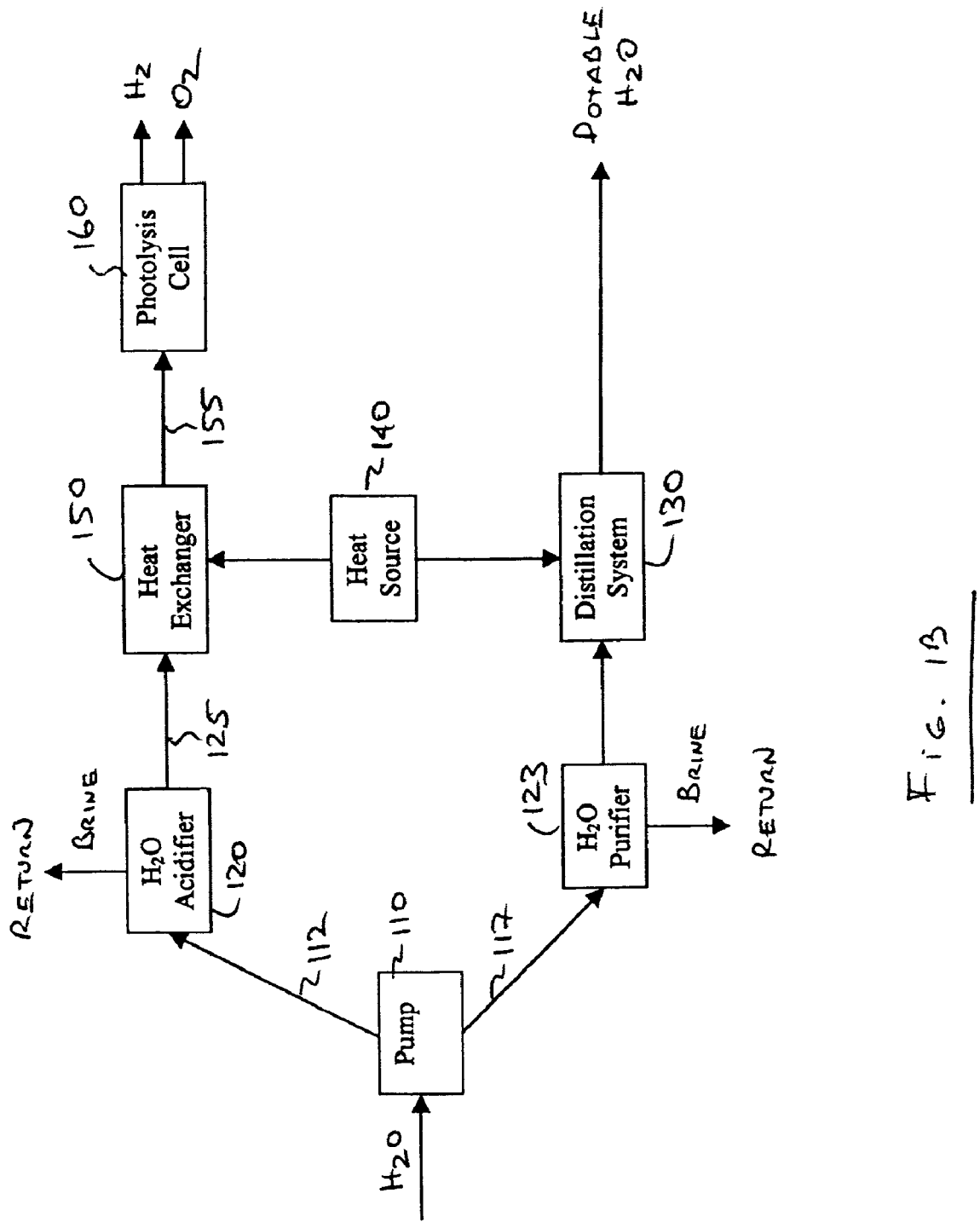
FIG. 1B shows a simplified block diagram of a photodissociation system employing the ultra fast dissociation method illustrated in FIG. 1A in accordance with the present invention.

FIG. 1B shows a simplified block diagram of a photodissociation system employing the method illustrated in FIG. 1A. The exemplary system illustrates a combined photolysis/water distillation system and includes a pump 110, a water acidifier 120, a water purifier 123, a distillation system 130, a heat source 140, a heat exchanger 150, and a photolysis cell 160.

Initially in the process, water, (e.g., seawater) is supplied to the system through an inlet using a pump 110. A portion of the pumped water is output to the distillation branch (potable water) and a second portion supplied to the photolysis system. The distillation branch includes a water purifier 123 and a distillation system 130 operable to remove impurities and reduce the water's salinity to potable levels. In one embodiment, a reverse osmosis filtration system functions as the water purifier 123, and a heat exchanger is employed as the distillation system 130.

The photolysis branch includes a water acidifier 120, which, in one embodiment, is a reverse osmosis filtration system. In a specific embodiment, the supplied seawater is passed through the reverse osmosis membrane twice to remove impurities, salt, and lower the pH of the resulting water to approximately 4.5. The resulting water consists of $H_3O^+$ (proton acid), herein referred to as "acidic water" 125. The acidic water 125 is supplied to a heat exchanger 150, which produces steam, herein referred to as an "acidic water vapor" 155. The heat exchanger 150 may be supplied heat from any conventional heat source, and in a specific example, natural gas-fueled molten carbonate fuel cells are used. In such an embodiment, the molten carbonate fuel cells power one or more components of the system 100, and the by-product heat generated by the fuel cells is supplied to the heat exchanger 150 to produce the acidic water vapor 155. Of course, other heat sources may be used alternatively or in addition in other embodiments of the present invention.

The acidic water vapor 155 includes $H_5O_2$ dihydronium radical ions, which, as noted above, are much more efficiently dissociated. The acidic steam 155 is supplied to a photolysis cell 160 which is operable to convert the acidic water vapor 155 to hydrogen gas $H_2$ and oxygen gas $O_2$. Several embodiments of the photolysis cell are described in greater detail below.

In a specific embodiment, the described system 100 is a high capacity system operable to produce 20,000 moles/minute of $H_2$ fuel. In this embodiment, the pump 110 is a high capacity pump operable to supply on the order of 10 million gallons of seawater per day, examples of which are available from the Liquid Handling Systems Corporation of Santa Ana, Calif. The water acidifier 120 and water purifier 123 are reverse osmosis filtration systems operable to process 5 MGD permeate (50% recovery), such as units available from Koch Membrane Systems, Inc. of San Diego, Calif. The heat source 140 is one or more molten carbonate fuel cells operable to generate approximately 250 kW of power, and operate at around 1200.degree. C. Exemplary units are available from FuelCell Energy, Inc. of Danbury, Conn. The heat exchanger 150 is operable to produce the acidic water vapor at between 120-210.degree. C. between 7-10 psi (0.5-0.7 bar); Tranter, Inc. of Wichita Falls, Tex. manufactures exemplary units. Those skilled in the art will appreciate that the present invention is not limited to a system of any particular scale, and systems of smaller or larger size may be constructed under alternative embodiments.

II. Photolysis Cell

The photolysis cell is operable to dissociate $H_2$ and $O_2$ from the acidic water or water vapor molecules contained therein. The preferred embodiment of the photolysis cell includes a wavelength conversion process by which an optically reflective coating and a corrugated reflective bottle wall are used to convert light of wavelengths longer than 246 nm to light at or below 246 nm, 246 nm representing the wavelength threshold for dissociating water molecules on a one photon per molecule basis. Radiolysis is additionally used to inhibit $H_2$ and $O_2$ recombination by maintaining these constituents in a charged state with ionizing radiation. These and other features are further illustrated in the figures presented herein.

Figure 2:
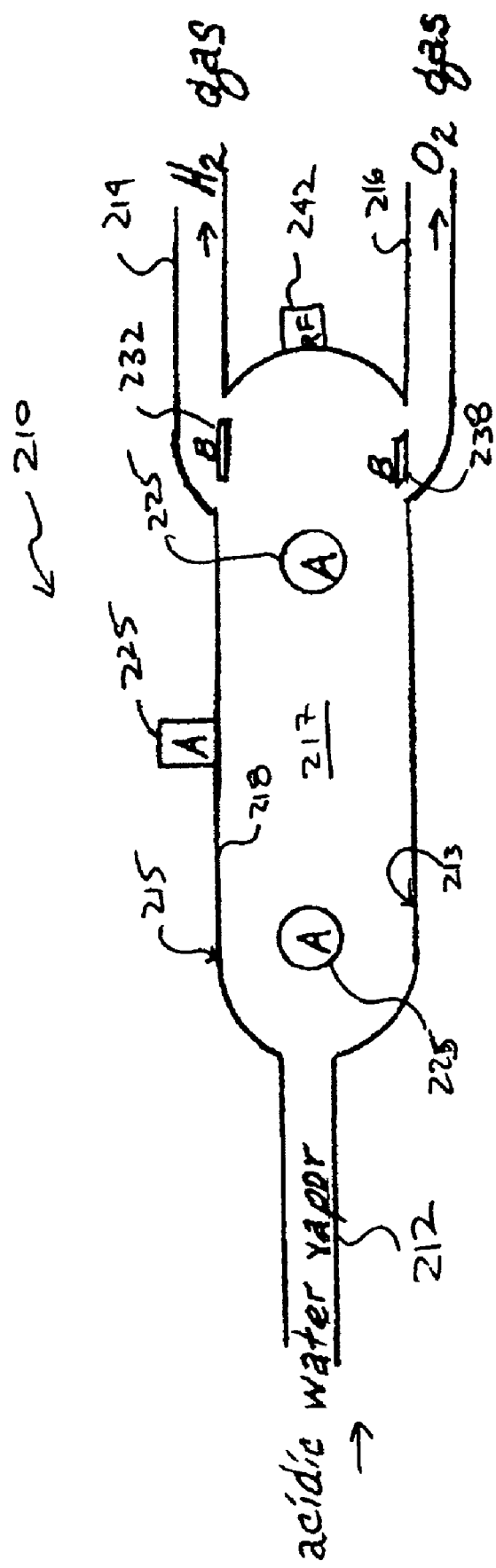
FIG. 2 illustrates a single stage photolysis cell in accordance with one embodiment of the present invention.

FIG. 2 illustrates a single-stage photolysis cell 200 in accordance with one embodiment of the present invention. The photolysis cell 200 includes a photolysis bottle 210 having an inlet 212 configured to receive water molecules, an $H_2$ outlet 214 configured to output $H_2$ gas, and an $O_2$ outlet 216 configured to output $O_2$ gas. The photolysis bottle 210 has an interior region 217 defined by a bottle wall 218 having an inner surface 213 and an outer surface 215. In a specific embodiment, the photolysis bottle 210 is generally cylindrical in shape with parabolic-shaped ends, has a volume of 0.5-3 liters, and is constructed from fused quartz silica, although bottles of other shapes, volumes, and composition may be used in alternative embodiments. In the preferred embodiment, the photolysis cell inlet is configured to receive acidic water vapor, although in an alternative embodiment, liquid phase water may be supplied and converted into a vapor within the photolysis cell. In such an embodiment, the inlet 212 is configured to receive liquid phase water.

The bottle 210 further includes one or more light ports 225 located on or near the wall's outer surface 215 and operable to guide light of a predefined wavelength(s) therethrough into the interior region 217. The light ports 225 may connect to a transmission medium, such as a fiber optic cable, or may itself comprise a light that generates the light to be injected into the interior region 217. In the preferred embodiment, the light ports comprise fiber optic cables coupled to one or more remotely light sources operating at one or more wavelengths between 1500 nm and 246 nm. In a further preferred embodiment, the aforementioned light source is a laser diode operating in the range of 820 nm, examples of which are available from Power Technology Incorporated of Little Rock, Ark. Of course, other light sources such as conventionally known lasers (gas, solid state, etc.), light emitting diodes, lamps, and natural sources such as solar radiation may be used alternatively, or in addition in alternative embodiments under the present invention.

The bottle 210 preferably includes an optically reflective coating disposed on the wall's outer surface 215 which is operable to reflect light of one or more wavelengths back into the interior region 217. Dissociation efficiency is enhanced by reflecting light within the interior region 217 one or more times, as will be further described below. In the preferred embodiment, the reflective coating is operable to reflect light between 1500 nm and 150 nm, and further preferably between 850 nm and 150 nm. Various materials may be used. In one embodiment, bare aluminum, which may form the bottle wall 218 is used to provide the desired reflectivity. In the exemplary embodiment in which the bottle is constructed from fused quartz silica, the reflective coating may consist of a di-electric metal oxide, such as hafnium dioxide, silicon dioxide, aluminum oxide, and similar materials. The reflective coating may be patterned around the light ports 225 so as to permit injection of the light signal into the interior region 217. In the preferred embodiment, the bottle wall 218 includes an undulated outer and/or inner surface, as will be described in greater detail with reference to FIGS. 3A and 3B below.

The bottle 210 additionally includes a cathode 232 located proximate to the $H_2$ outlet, and an anode located proximate to the $O_2$ outlet. The cathode and anode 232 and 238 are negatively and positively charged electrodes, respectively, which are operable to liberate the positively charged $H_2$ molecules and negatively charged $O_2$ molecules. Either electrode may be located within the interior region 217 of the bottle 210, or on/proximate to the bottle wall's outer surface 215. In the latter case, the electrode's voltage potential is electrically-coupled (electrostatically or electromagnetically) through the wall 218 to the interior region 217 to liberate the $H_2$ or $O_2$ molecules therein. The latter implementation is particularly advantageous, as the externally located electrodes exhibit longer life cycles, require less maintenance, and are more conveniently replaced. In a specific embodiment, the cathode 232 and anode 238 consist of Schottky barrier rectifiers. Those skilled in the art will readily appreciate that electrodes of alternative construction may be used in other embodiments under the present invention.

The bottle 210 further includes an RF port 242 located on or near the wall's outer surface 215, the RF port being configured to electromagnetically couple an RF (radio frequency) signal of predefined frequency(ies) into the interior region 217. In one embodiment, the frequency(ies) of the supplied RF signal is selected to substantially match the absorption frequency(ies) of the acidic water vapor molecule so as to inhibit recombination of the $H_2$ and $O_2$ molecules after dissociation. In a second embodiment, the amplitude and frequency of the RF signal is selected so as to bombard the $H_2$ and $O_2$ constituents with ionizing radiation, thereby maintaining their present dissociated state. The RF port 242 may comprise any conventional structure operable to launch the desired RF frequency(ies) signal into the interior region 217, such structures including a TEM (transverse electromagnetic) structure such as coaxial cable, or TE (transverse electric) or TM (transverse magnetic) structures, such as a waveguide. Further alternatively, the RF port 242 may itself comprise a RF signal source itself which produces a signal (or signals) substantially at the desired amplitude and frequency(ies). In a specific embodiment, the RF port 242 comprises a variable oscillator (such as a voltage controlled oscillator) which can be set to output one frequency or a range of frequencies, preferably between 5 GHz and 96 GHz at amplitudes ranging up to 25 watts, and more preferably at 48 GHz and 0.5 to 5 watts.

Figure 3B:
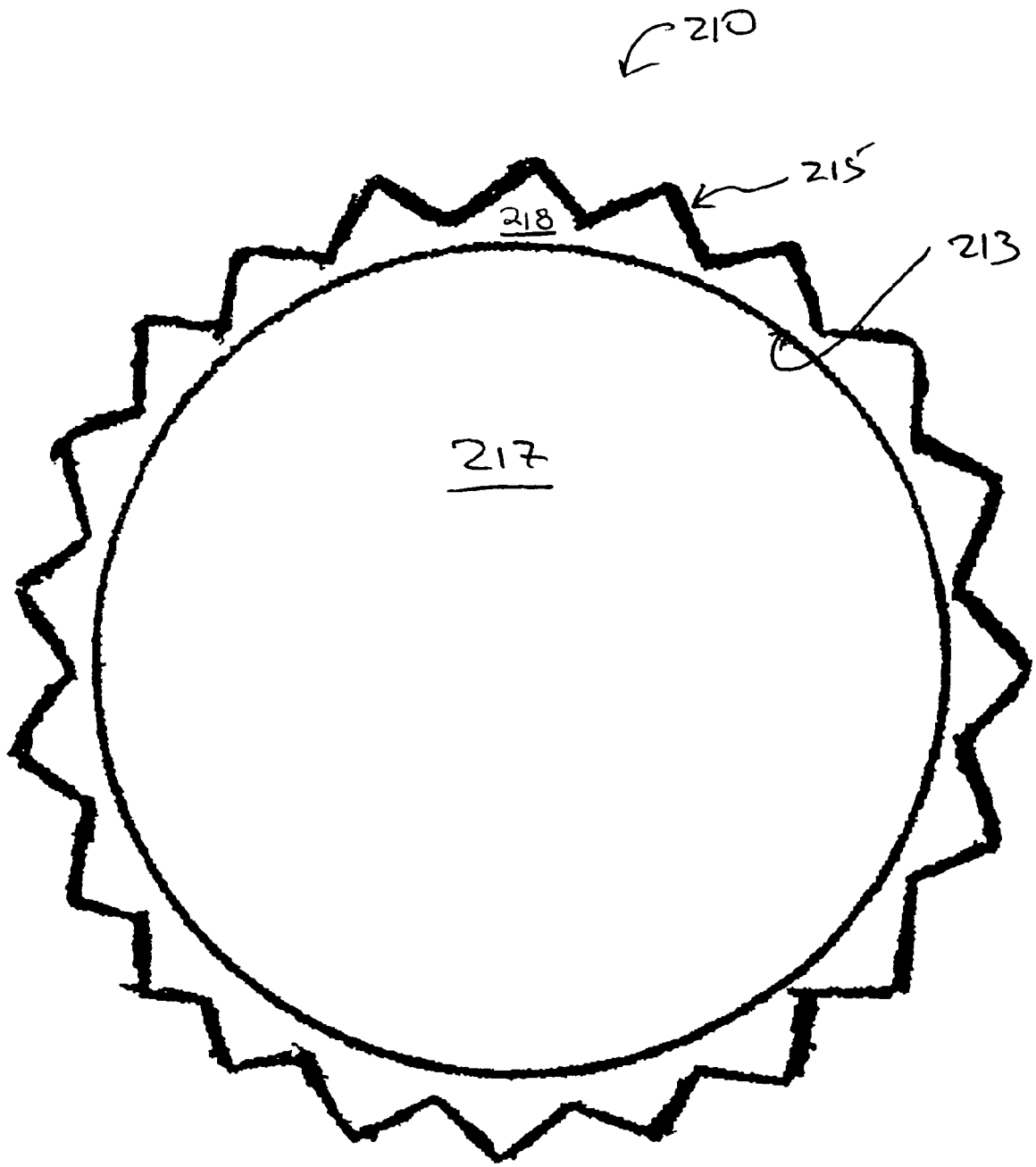

FIGS. 3A and 3B illustrate side and cross-sectional views, respectively, of a specific embodiment of the photolysis bottle in accordance with the present invention. As shown, the bottle wall 218 includes an undulated outer surface 215 (viewed cross-sectionally). In particular, the shape is corrugated, having edges which are formed by 45.degree. angles, thereby shifting the incident angle of light reflecting thereupon from 0.degree. to 45.degree. When the above-described optically reflective coating is deposited on the wall's outer surface 215, the light reflected therefrom will exhibit a wavelength approximately 10% shorter as described in the publication "The Photonics Design and Applications Handbook," 48th International Ed., 2002, published by Photonics Spectra., herein incorporated by reference. Accordingly, longer wavelength light can be injected into the interior region 217 and be converted to shorter wavelengths by reflecting the supplied light one or more times within the interior region 217. In a specific embodiment, a 820 nm light source is used to supply the initial light wave, the injected light undergoing 12 reflections to reach an effective wavelength of 233 nm to more efficiently dissociate $H_2$ and $O_2$ from the acidic water vapor. Of course, other arrangements are possible in which light of longer or shorter wavelengths are supplied and correspondingly a larger or smaller number of reflections are needed to reach the 246 nm dissociation threshold. The wall's surface geometry is not limited to the particular corrugated surface shown, and other undulated-shaped surfaces (e.g., corrugations formed at other angles, smooth corrugations, etc.) may be employed in alternative embodiments. Further alternatively, the undulated surface may be formed on the inside surface 213 of the bottle wall 218, with the wall's outer surface being relatively flat, or still alternatively, the undulated feature may be formed on both the inner and outer surfaces. Additionally, the optically reflective coating may be deposited on either the inside or outside surfaces of the bottle wall 218 to provide the requisite wavelength conversion. In embodiments in which the undulated surface is formed on the inside surface 213 of the bottle wall 218, the optically reflective coating may be deposited on the inside surface 213 if it is resistant to the corrosive effects of the acidic water vapor.

Figure 4:
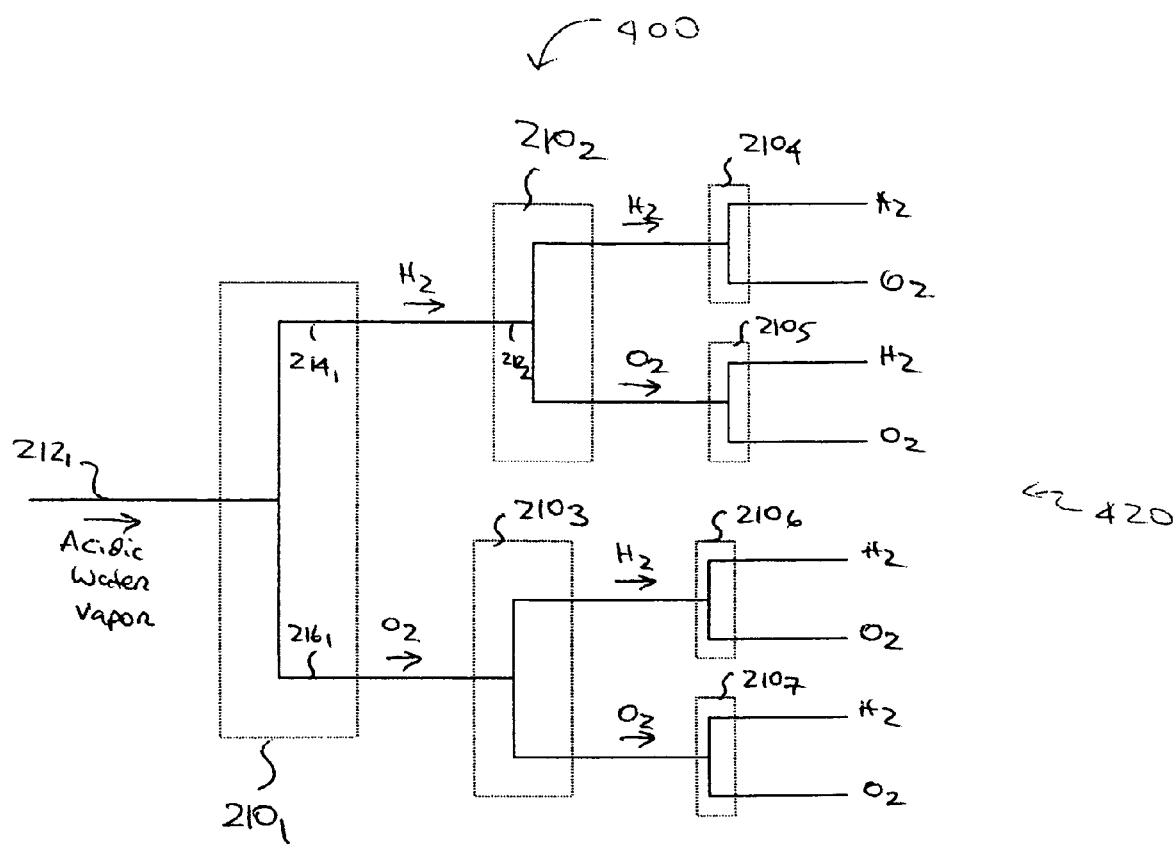
FIG. 4 illustrates a multi-stage photolysis cell in accordance with one embodiment of the present invention.

FIG. 4 illustrates a multi-stage photolysis cell 400 in accordance with one embodiment of the invention. The multi-stage cell 400 provides higher purity $H_2$ and $O_2$ gas 420 as the non-dissociated water vapor and subsequent spur reactions contained in previous processing steps is reduced in successive stages.

The illustrated embodiment shows a three-stage, seven cell arrangement in which an initial water vapor input 212 is processed into high purity $H_2$ and $O_2$ gas 420. The photolysis cells are coupled (i.e., connected either directly or via one or more interposed elements) to the preceding bottle's outlet port. The first stage consists of a single cell $210_1$, which feeds each of two second-stage cells $210_2$ and $210_3$, each of which, in turn, feeds four third-stage cells $210_4$-$210_7$. In each successive stage, non-dissociated water vapor cantained in the $H_2$ or $O_2$ output is further reduced. In this manner, the $H_2$ and $O_2$ gas provided at the output 420 is of high purity. Each of the corresponding $H_2$ and $O_2$ outputs can be combined and stored, used to power the system's fuel cells, or otherwise processed as required.

Each of the illustrated cells may comprise the aforementioned photolysis cells 210 described above, or their alternatives. Further, all of the cells may be identical in construction and operation, or alternatively, there may be variation, for instance, as to bottle size and construction, photonic operation (e.g., variation in wavelengths used), and/or RF signal operation (e.g., variation in amplitude or frequency of the RF signal, if employed). In a particular embodiment, the first stage cell is substantially 3 liters in volume, the second stage cells are 1.5 liters, and the third stage cells are 1.0 liters in volume, each cell operating under substantially the same photonic and RF signal conditions, i.e., are provided substantially the same wavelength of light and RF signal frequency.

Figure 5:
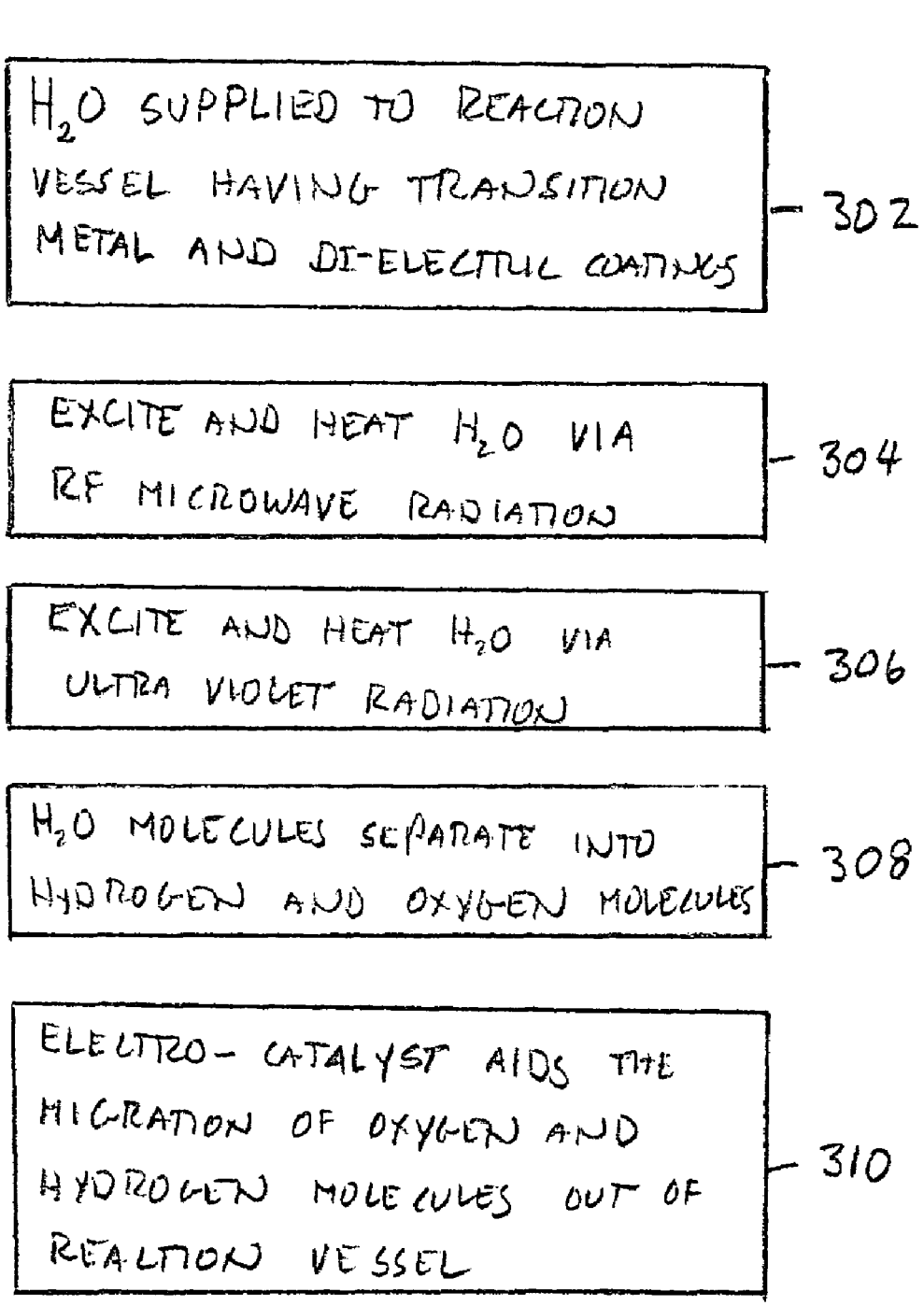
FIG. 5 shows an embodiment of a method employing dissociation of water molecules in accordance with the present invention.

FIG. 5 illustrates an embodiment 300 of a method for dissociation of water molecules in accordance with one embodiment of the present invention. Initially at 302, water is supplied to a reaction vessel, an embodiment of which is shown and described in FIG. 6 below. The supplied water may be from any source, such as a well, a lake, or an ocean as will be described further below. The interior of the reaction vessel has previously been coated with at least one transition metal oxide photo catalyst. Next at 304 and 306, the water is excited and heated by use of RF microwave radiation from a radiolysis apparatus and ultra violet radiation emitted from a photolysis apparatus. The RF microwave radiation is provided by a variable voltage controlled oscillator and a wave guide emitter at a power range of 0.5-5 watts and frequencies of 20 to 25 GHz. The excited water molecules are heated into water vapor. The heated water vapor molecules then separate into $H_2$ and $O_2$ molecules, as shown at 306, At 310, an electro-catalyst, such as a nickel oxide coating applied to the reaction vessel, assists the migration of the hydrogen and oxygen molecules to exit the reaction vessel separately.

Figure 6:
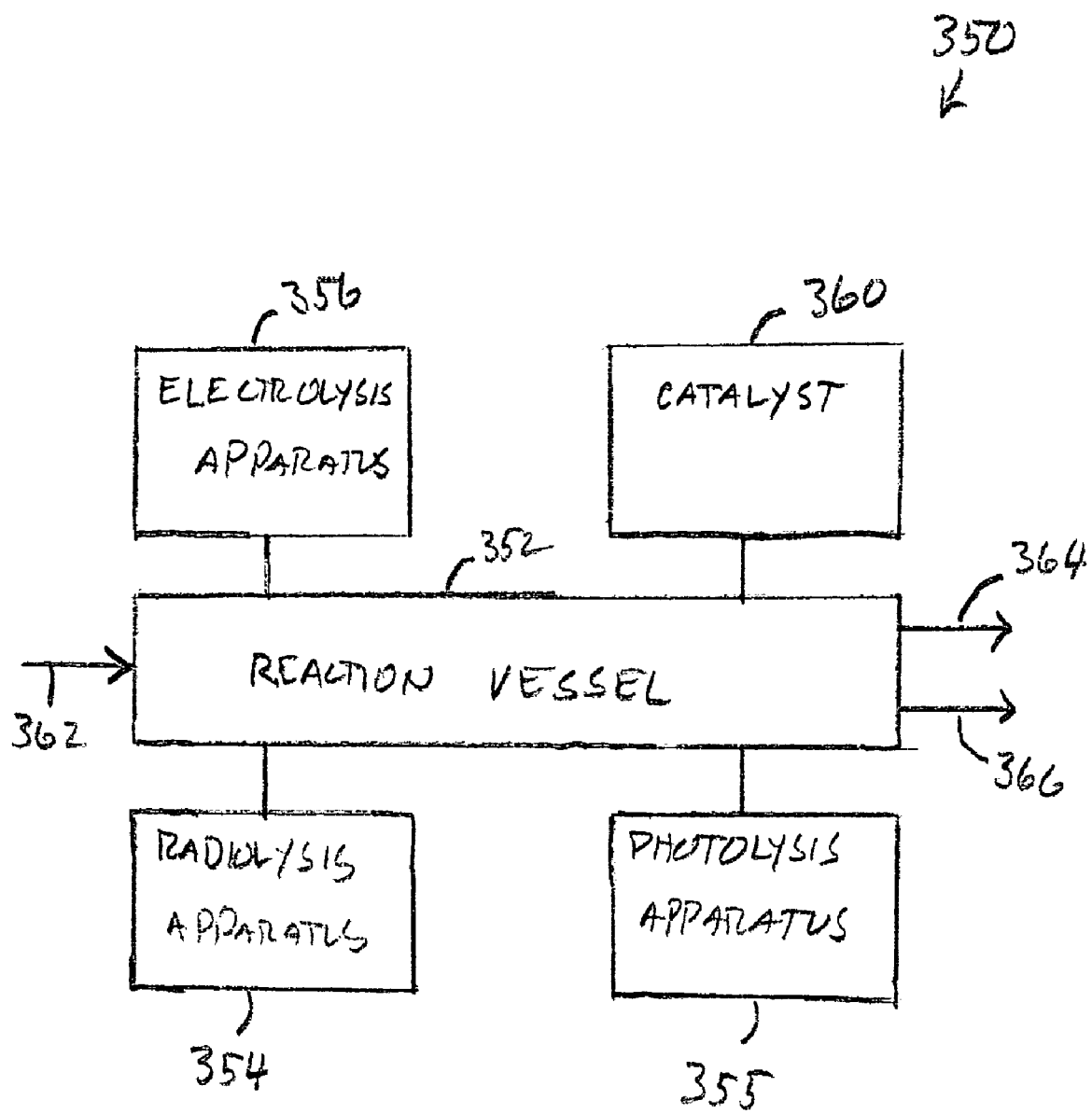
FIG. 6 shows an embodiment of a simplified block diagram of a dissociation system employing the dissociation method illustrated in FIG. 5 in accordance with the present invention.

FIG. 6 shows a simplified block diagram of an embodiment 350 of a dissociation system employing the method illustrated in FIG. 5. The exemplary system illustrates a reaction vessel 352 having an inlet 362 for water, an oxygen outlet 364 and a hydrogen outlet 366, at least one radiolysis mechanism 354, such as RF emitter apparatus in communication with reaction vessel 352, at least one photolysis apparatus 355 in communication with said reaction vessel to inject light into the vessel, at least one electrolysis apparatus 356 in communication with reaction vessel 352 to effect cathode anode migration for the respective gases (oxygen and hydrogen) to exit the vessel, and at least one catalyst 360 located within the interior 358 of said reaction vessel 352.

Initially in the process, the interior surface of reaction vessel 352 is coated with a transition metal oxide catalyst 370. The transition metal oxide catalyst can be taken from the group selected consisting of titanium dioxides, zirconia, nickel, nickel oxides and sodium tantalate along with combinations thereof. Water is then supplied to the interior 358 of the reaction vessel 352 through an inlet. While the water can be in a aqueous state, it is preferred the water be in a vapor state.

The radiolysis mechanism 354 emits RF signals into the interior of the reaction vessel 352. The RF signals cause the water molecules to become excited and heated. Embodiments of the radiolysis mechanism 354 can include one or more RF port configured to couple an RF signal into the interior of reaction vessel 352. The RF signals can operated between 5 and 96 GHz. Moreover, the frequency of the RF signal can be set to substantially match the resonant frequency of the vapor phase water molecules.

Another embodiment of the RF emitter apparatus can include a variable voltage controlled oscillator and a wireless RF waveguide emitter in communication with the outer surface of said reaction vessel.

The photolysis apparatus 355 emits light radiation into the interior 358 of the reaction vessel 352. This light radiation further excites the water vapor molecules causing their separation into $H_2$ and $O_2$ molecules.

One embodiment of the photolysis apparatus 355 comprises at least one mercury vapor lamp which emits ultra violet light into the interior of reaction vessel 352. While the wavelengths of the UV radiation can vary, it has been found that UV radiation having wavelengths between 150 nm and 385 nm is preferred, with wavelengths between of 185 nm and 254 nm being optimal. In order to protect the user from UV radiation exposure, a shroud is employed to reflect the UV light into the interior of the reaction vessel. It is understood that the shroud can be utilized on more then one reaction vessel simultaneously. The inclusion of a single shroud with a single reaction vessel is merely illustrative and not meant to be limiting. Additionally at least one nonlinear optical crystal can be also utilized in order to emit harmonically generated UV wavelengths from various sources, such as solar radiation.

In order to utilize the mercury light lamps, the reaction vessel 352 is composed of fused quartz silica and having a di-electric metal coating along its outer surface. This coating could be taken from the group of hafnium dioxide, silicone dioxide and aluminum oxide. The di-electric coating allows the reaction vessel to withstand temperatures upwards of 2000[deg] F. Further, this quartz material is transparent to UV radiation and the metal coating reflects the UV radiation and contains it inside the reaction vessel.

The electrolysis apparatus 356 the provides electrolysis at the exit ports of reaction vessel to effect the separation of the $H_2$ and $O_2$ molecules. One embodiment of the electrolysis apparatus is at least one electrolysis insulator plate in communication with the reaction vessel proximate to said second end. Another embodiment of the electrolysis apparatus 356 is a at least one coating of nickel oxide along the interior surface of said second end of said reaction vessel and proximate said at least two outlet ports.

Figure 7:
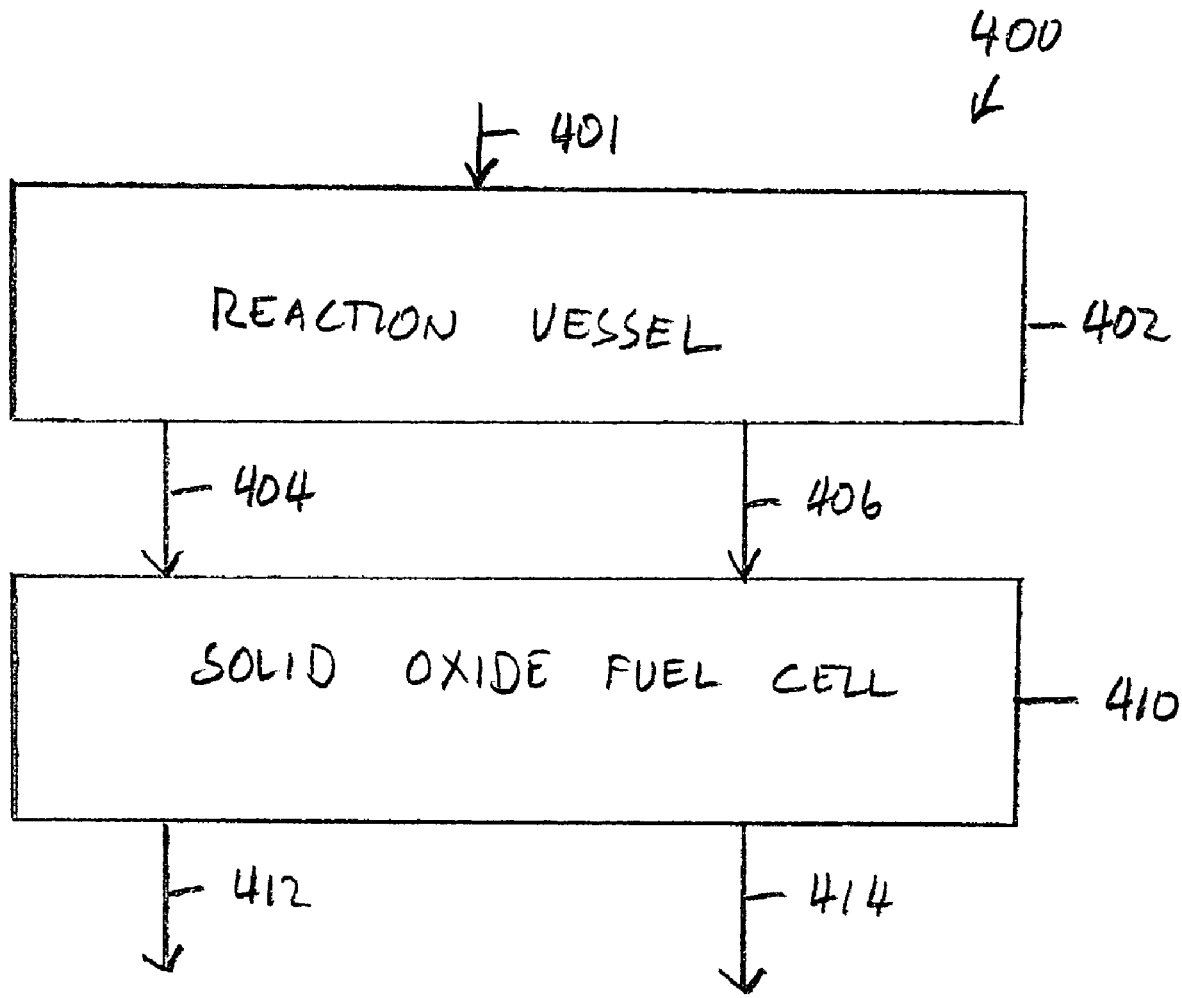
FIG. 7 shows a simplified block diagram of a system employing the dissociation of water of the present invention in combination with a solid oxide fuel cell.

FIG. 7 shows a simplified block diagram of an embodiment 400 of a system employing the dissociation system of the present invention in combination with a solid oxide fuel cell. The exemplary system illustrates a reaction vessel 402 having an inlet 401 for water, an oxygen outlet 406 and a hydrogen outlet 404. The oxygen outlet 406 and hydrogen outlet 404 are in combination with a solid oxide fuel cell 410. Also in communication with the solid oxide fuel cell 410 is an inlet for natural gas 408. The solid oxide fuel cell then produces power 412 and heat 414.

In operation, the solid oxide fuel cell utilizes natural gas supplied via the inlet for natural gas 408 along with oxygen and hydrogen split from water which act as fuel enhancements. The result is heat and power where such can then be used for various purposes, such as a heat source in a heat transfer system or a power source for an apparatus.

The use of the separated oxygen and hydrogen with a solid oxide fuel is advantageous. Oxygen obtained from water splitting has not previously been attributed an energy value. Oxygen can, however, become an energy carrier when supplied to a solid oxide fuel cell. When a solid oxide fuel cell is supplied with 100% pure oxygen to its cathode, instead of ambient air, the electrical output is doubled. This provides for a unique relationship between the disassociation of water molecules and solid oxide fuel cell, and related applications such as the desalination of seawater.

For every two moles of water, the chemical reaction for splitting water molecules into their constituent elements of hydrogen and oxygen produces two moles of hydrogen and one mole of oxygen. This translates into 4 g of hydrogen and 32 g of oxygen for every 36 g of water. The initiation of this reaction requires the input of energy to drive the reaction. Breaking the water molecule is a two step process. The first step removes one proton while the second step breaks the OH radical into hydrogen and oxygen molecules.

As set out above, the inventive process utilizes light, electrical and microwave energies to generate hydrogen and oxygen from water. Typically, the water is in a vapor state. This vapor is irradiated with light emitted from mercury vapor lamps that emit UV radiation in the duel band wavelengths of 185 and 254 nm. The interior of the reaction vessel is coated with one or more transition metal oxides photo catalysts. This coating will act to contain the UV radiation inside the reaction vessel. Microwave energy is supplied by a RF wave emitter. The UV radiation and RF wavelengths will excite and heat the water molecules to the point of separation of hydrogen and oxygen. The transition metal oxide coating on the interior of the reaction vessel will also act as an electro-catalyst to accomplish the migration of the hydrogen and oxygen molecules to exit the reaction vessel separately. Reaction temperatures inside the reaction vessel will be approximately 505 Kelvin.

A solid oxide fuel cell have an operating temperature of approximately 1700[Deg]F. Utilizing this heat by-product greatly improves the overall efficiency of its relationship with the inventive disassociation system. By utilizing the captive oxygen produced by the disassociation system, the solid oxide fuel cell improves its overall electrical output. Moreover, by capturing the heat produced by the solid oxide fuel cell, the temperature of the water vapor can be increased thus requiring less energy for the splitting of water molecules.

Figure 8:
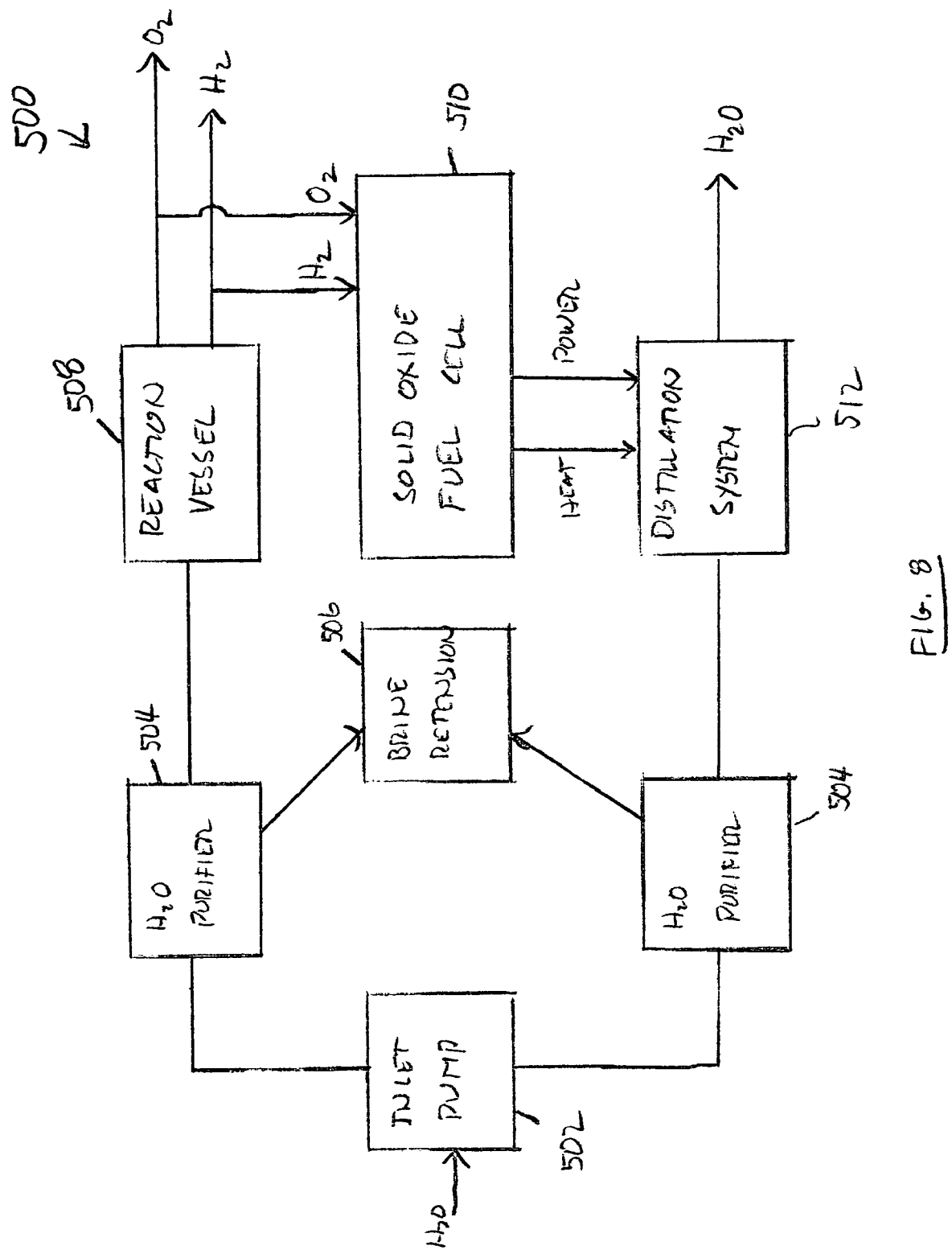
FIG. 8 shows a simplified block diagram of a distillation system employing the system illustrated in FIG. 7 in accordance with the present invention.
Figure 9:
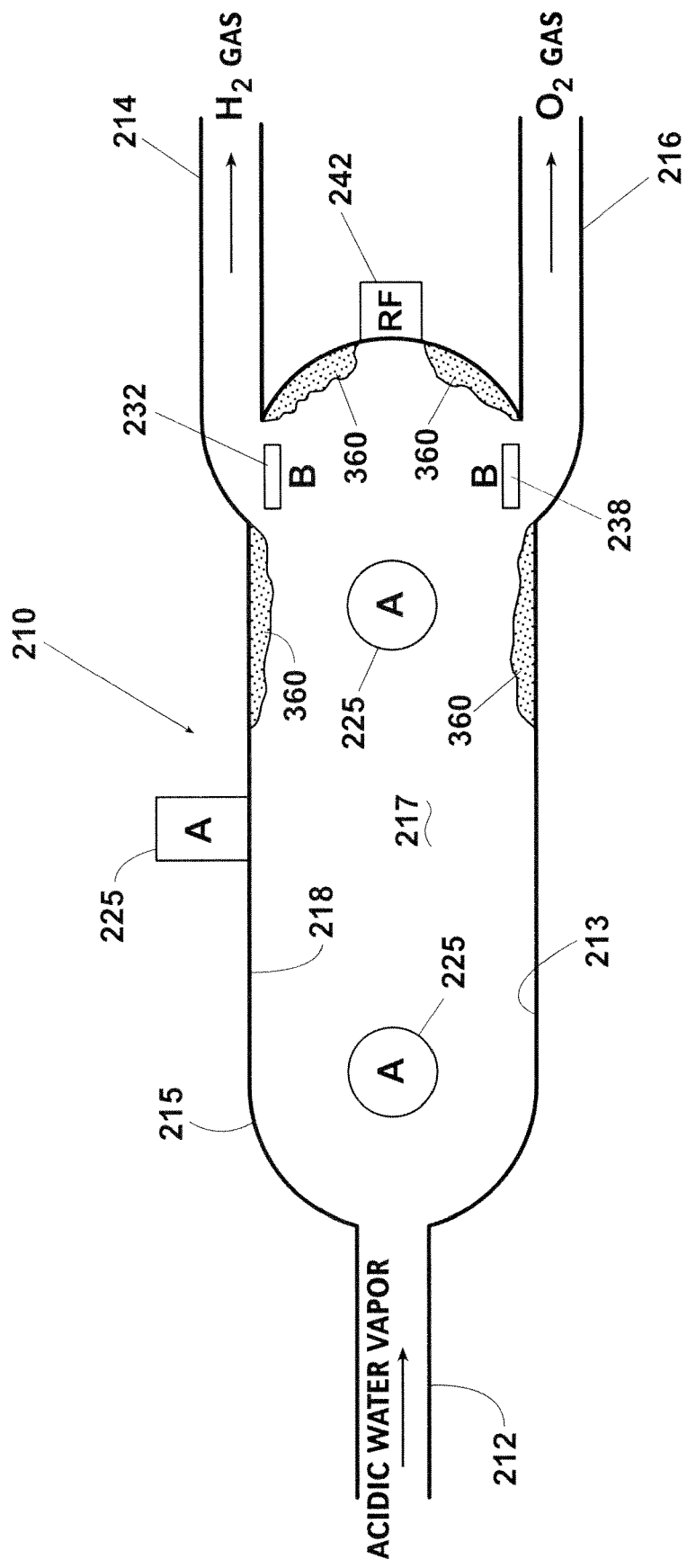
FIG. 9 illustrates a single stage photolysis with a coating of nickel oxide.

FIG. 8 shows a simplified block diagram of an embodiment 500 of a seawater distillation system which utilizes the solid oxide fuel cell 510 in combination with the inventive disassociation system 508. Inlet pump 502 draws in seawater from an exterior source. Seawater is then provided to at least one water purifiers 504. These purifiers remove brine and other contaminants. The brine is stored in a brine retention apparatus 506. One part of the purified water is provided to the reaction vessel 508 to undergo the splitting of its water molecules into separate hydrogen and oxygen molecules. The other part of the purified water is provided to a distillation apparatus 512 to undergo a distillation of salt therefrom. At least a part of the oxygen and/or hydrogen which is produced by the disassociation process set out above is provided to the solid oxide fuel cell 510. The solid oxide fuel cell 510 the produces heat and power to effectuate the distillation process. The result being potable water and separated oxygen and hydrogen from seawater.

Brine that is stored in a brine retention apparatus can be further reduced to obtain sodium and chlorine from the salt, NACL. One method is calcium electrolysis to separate the sodium and chloride molecules. The chloride can be marketed to the chlorine industry. The sodium can be used as an energy carrier due to its volatility with exothermic reactions when exposed to water. This energy medium from sodium can be supplied to steam turbine technology to increase electrical power output.

The foregoing embodiments are provided to illustrate specific aspects of the invention and are not intended to provide, nor do they legally establish the boundaries of the present invention, the metes and bounds of which are hereby established by the following claims.

What is claimed is:

1. A dissociation system configured to dissociate water into $H_2$ gas and $O_2$ gas, said dissociation system comprising:

a reaction vessel having a cylindrical body, a first end and a second end defining an interior region, said reaction vessel further having an inlet located proximate said first end for receiving water from a water supply into said interior and at least two outlet ports located proximate said second end, wherein at least one of said at least two outlet ports is positioned for the egress of $H_2$ and at least one of said at least two outlet ports is positioned for the egress of $O_2$;

at least one RF apparatus in communication with said reaction vessel;

at least one photolysis apparatus in communication with said reaction vessel;

at least one electrolysis apparatus in communication with said reaction vessel; and at least one catalyst located within the interior region of said reaction vessel.

2. The dissociation system of claim 1, wherein said at least one RF apparatus is defined as comprising at least one RF port configured to couple a RF emitter emitting RF signal into the interior region of said reaction vessel.

3. The dissociation system of claim 1, wherein said at least one RF apparatus comprises at least one RF port configured to couple an RF emitter emitting RF signal into the interior region of said reaction vessel, said RF signal operating between 5 and 96 GHz.

4. The dissociation system of claim 1, wherein said at least one RF apparatus is defined comprising at least one RF port configured to couple an RF emitter emitting RF signal into the interior region of said reaction vessel, wherein the frequency of the RF signal substantially matches the absorption frequency of the vapor phase water molecules.

5. The dissociation system of claim 1, wherein said at least one RF apparatus is defined as a wireless RF waveguide emitter in communication with the outer surface of said reaction vessel.

6. The dissociation system of claim 1, wherein said at least one photolysis apparatus includes means for emitting light into said interior region of said reaction vessel.

7. The dissociation system of claim 6, wherein said means for emitting light comprises at least one mercury vapor lamp emitting ultra violet light into said interior region of said reaction vessel.

8. The dissociation system of claim 7, wherein said at least one photolysis apparatus further comprises at least one non-linear optical crystal and wherein said ultra violet light is harmonically generated.

9. The dissociation system of claim 7, wherein said ultra violet light has wavelengths of between 150 nm and 385 nm.

10. The dissociation system of claim 7, wherein said at least one photolysis apparatus further comprises a shroud in communication with the outer surface of said reaction vessel.

11. The dissociation system of claim 1, wherein said at least one reaction vessel is further defined as being constructed of fused quartz silica and having a reflective coating along its outer surface.

12. The dissociation system of claim 11 wherein said reflective coating is aluminum.

13. The dissociation system of claim 1, wherein said at least one electrolysis apparatus is defined as at least one electrolysis insulator plate in communication with said reaction vessel proximate to said second end.

14. The dissociation system of claim 1, wherein said at least one electrolysis apparatus is defined as at least one coating of nickel oxide along the interior surface of said second end of said reaction vessel and proximate said at least two outlet ports.

15. The dissociation system of claim 1, wherein said at least one catalyst is defined as at least one coating of transition metal oxide along the interior surface of said reaction vessel.

16. The dissociation system of claim 15, wherein said transition metal oxide is taken from the group selected consisting of titanium dioxides, zirconia, nickel, nickel oxides and sodium tantalate or a combination thereof.

17. The dissociation system of claim 1, wherein said at least one RF apparatus is defined as a wireless RF waveguide emitter in communication with the outer surface of said reaction vessel; wherein said at least one catalyst is defined as at least one coating of transition metal oxide along the interior surface of said reaction vessel; wherein said at least one photolysis apparatus comprises at least one mercury vapor lamp emitting ultra violet light into said interior of said reaction vessel; wherein said at least one electrolysis apparatus is defined as at least one coating of nickel oxide along the interior surface of said second end of said reaction vessel and proximate said at least two outlet ports and wherein said at least one reaction vessel is further defined as being constructed of fused quartz silica and having a reflective coating along its outer surface.

18. The dissociation system of claim 17 wherein said reflective coating is aluminum oxide.

19. A dissociation system configured to dissociate water into $H_2$ gas and $O_2$ gas, said dissociation system comprising:

a reaction vessel having a body, a first end and a second end defining an interior, said reaction vessel further having an inlet located proximate said first end for receiving water from a water supply into said interior and at least two outlet ports located proximate said second end, wherein each port allows $H_2$ or $O_2$ to egress therefrom;

at least one RF apparatus in communication with said reaction vessel;

at least one photolysis apparatus in communication with said reaction vessel; and at least one catalyst located within the interior of said reaction vessel.

20. The dissociation system of claim 19 wherein said at least one catalyst is a transition metal oxide catalyst.

* * * * *